(No Model.)
T. B. NILES.
SEED PLANTER.
No. 285,652.    Patented Sept. 25, 1883.
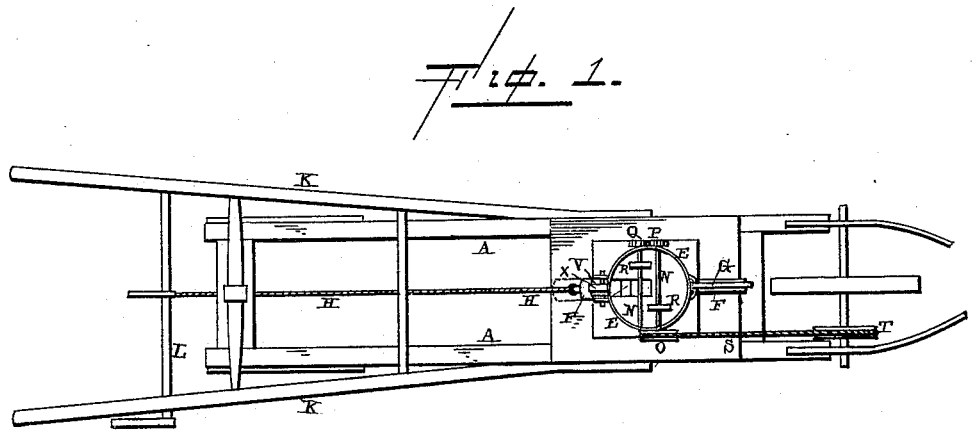
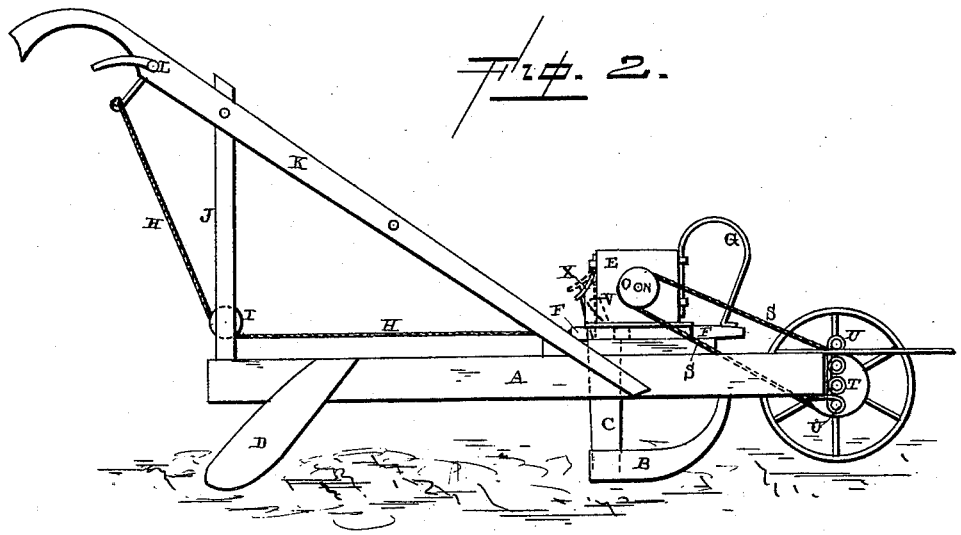
Witnesses.
Louis F. Gardner
E. D. York
Inventor.
T. B. Niles
per
F. A. Lehmann,
atty.

UNITED STATES PATENT OFFICE.

TRUMAN B. NILES, OF SWANVILLE, INDIANA.

SEED-PLANTER.

SPECIFICATION forming part of Letters Patent No. 285,652, dated September 25, 1883.

Application filed February 21, 1883. (No model.)

*To all whom it may concern:*

Be it known that I, T. B. NILES, of Swanville, in the county of Jefferson and State of Indiana, have invented certain new and useful Improvements in Seed-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in walking seed-planters; and it consists in the combination of the hopper having an opening through its rear side, a prong for forcing the seed out of the slide, and which is pivoted to the rear of the hopper, opposite the slot in the same, the seed-slide, and the spring which bears upon the prong, the prong being adapted to be forced in the hopper as the slide moves forward, as will be more fully described hereinafter.

The object of my invention is to produce a planter for planting corn, cotton, broom-corn, cane-seed, beans, and seed of all kinds, and which is provided with suitable means for forcing cotton-seed into the seed-slide, and means for forcing the seed from the slide, and thus preventing the parts from ever clogging in their action.

Figure 1 is a plan view of my invention. Fig. 2 is a side elevation of the same.

A represents a suitable frame-work of any desired shape, size, or construction that may be preferred, and which is provided with the usual furrow-opener, B, the seed-tube C, and the covering devices D, as shown. Upon the top of the front of the frame is placed the seed box or hopper E, which is preferably made round, as shown, and under or through which works the usual seed-slide, F. This slide has a suitable spring, G, attached to its front end, so as to always return the slide to position after it has been moved by the operator. Fastened to the rear end of this slide, which is provided with the usual means for regulating the size of the opening, is the cord, chain, or wire H, which passes under a grooved pulley, I, which is journaled in the standard J, which supports the two handles K. The upper end of this cord, chain, or wire is attached to the rod or shaft L, which passes through the two handles in a convenient position where it can be operated by the plowman's hands as he walks along. Each time the seed-slide is drawn backward the seed are dropped through the seed-tube into the ground, and then the spring returns the slide back to position to again have its opening filled with seed.

Where sticky seed—such as cotton-seed—are to be planted, it is necessary that they should not only be stirred to keep them from balling together, but to force them into the slide. For this purpose two shafts, N, are journaled in the seed-box, one of which is provided with a grooved pulley, O, upon one end, and a spur-wheel, P, upon its other end. This spur-wheel meshes with a corresponding spur-wheel, Q, upon a second shaft, and thus causes the two shafts to revolve in opposite directions. Each shaft is provided with a suitable spur-wheel or other device, R, which, as it revolves, forces the seed downward, so that they will drop into the opening in the slide. The groove-pulley O receives its motion through a driving cord, belt, or chain, S, which also passes around a grooved pulley, T, which is placed upon the shaft of the driving-wheel. This driving-wheel supports the front of the frame, and is made adjustable vertically by means of the eyes or bearings, U, which are formed upon the front end of the frame. These eyes or bearings are formed from one continuous piece of metal, which is bent as shown, and the eyes are formed one above the other, so that the wheel can be adjusted vertically for the purpose of changing the depth at which it is desired to plant the seeds.

In order to prevent the seed from sticking in the slide, a suitable opening is made through the rear side of the seed box or hopper, and journaled in this opening is a suitable prong, V, which is just long enough, when standing in a vertical position, to have its lower end pass down through the hole in the seed-slide. As the seed-slide is forced inward for the purpose of becoming filled, the lower end of the prong is forced forward, so that the prong stands in an inclined position, and as the seed-slide is drawn backward this prong slips into the hole and forces the seed which are contained therein through the slide into the seed-tube. Secured to the rear side of the seed-box is a suitable spring, X, which bears against the rear upper edge of this prong and forces it forward into a vertical position as soon as the lower end of the prong slips into the hole in the seed-slide. This prong not only serves to force the seed into the seed-tube, but at the same time clears away the extra seed and prevents more than the regulated number being dropped into the furrows.

Having thus described my invention, I claim—

In a seed-planter, the combination of the hopper E, having an opening through its rear side, the prong V, pivoted to the rear of the hopper, opposite to the slot in the same, the seed-slide F, and the spring which bears upon the prong, the prong being adapted to be forced into the hopper as the slide moves forward, substantially as shown.

In testimony whereof I affix my signature in presence of two witnesses.

TRUMAN B. NILES.

Witnesses:
R. A. BAIN,
J. P. McKNIGHT.